United States Patent
Kosaka

(10) Patent No.: US 10,771,639 B1
(45) Date of Patent: *Sep. 8, 2020

(54) IMAGE FORMING SYSTEM, IMAGE FORMING APPARATUS, AND IMAGE FORMING METHOD THAT ALLOWS TO PULL PRINT WITHOUT SERVER

(71) Applicant: KYOCERA Document Solutions Inc., Osaka (JP)

(72) Inventor: Naohiko Kosaka, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/393,470

(22) Filed: Apr. 24, 2019

(51) Int. Cl.
*G06F 3/12* (2006.01)
*H04N 1/00* (2006.01)
*H04N 1/32* (2006.01)

(52) U.S. Cl.
CPC ......... *H04N 1/0023* (2013.01); *G06F 3/1209* (2013.01); *G06F 3/1285* (2013.01); *H04N 1/00915* (2013.01); *H04N 1/32646* (2013.01); *H04N 2201/0094* (2013.01)

(58) Field of Classification Search
CPC .... G06F 3/1222; G06F 3/1238; G06F 3/1205; G06F 3/1288; G06F 3/1291; G06F 3/1276; H04N 1/4486; H04N 1/00244; H04N 1/0023; H04N 2201/0094; G07B 2017/0075; H04L 29/06666; H04L 63/0435; H04L 63/045; H04L 9/14
See application file for complete search history.

(56) References Cited

U.S. PATENT DOCUMENTS

| | | | |
|---|---|---|---|
| 7,016,901 B2 | 3/2006 | Eikenbery | |
| 10,063,529 B2* | 8/2018 | Milazzo | H04L 9/0825 |
| 10,084,600 B1* | 9/2018 | Irwan | H04L 9/0637 |
| 2018/0032708 A1* | 2/2018 | Mori | G06F 21/608 |
| 2019/0101896 A1* | 4/2019 | Cantrell | H04L 9/0637 |
| 2019/0311148 A1* | 10/2019 | Andrade | G06F 21/6218 |

\* cited by examiner

*Primary Examiner* — Juan M Guillermety
(74) *Attorney, Agent, or Firm* — Hawaii Patent Services; Nathaniel K. Fedde; Kenton N. Fedde

(57) ABSTRACT

Provided is an image forming system for pull printing and does not need a server. A division part generates a blockchain of a document data by generating identification information of the document data for pull print, by dividing into blocks, and by calculating and including a previous hash value of a previous block in order. A storing and transmitting part transmits each of divided blocks. A storing part that stores received block. An outputting and transmitting part transmits the stored block according to the instructions. An identification information acquisition part acquires the identification information of the document data. A block acquisition part acquires each of the block of the document data corresponding to the identification information. A document reproduction part packs each of the block and reproduces to the document data. An image forming part outputs the document data.

13 Claims, 7 Drawing Sheets

IMAGE FORMING SYSTEM, IMAGE FORMING APPARATUS, AND IMAGE FORMING METHOD THAT ALLOWS TO PULL PRINT WITHOUT SERVER

BACKGROUND

The present disclosure relates to an image forming system, an image forming apparatus, and an image forming method, especially is related with the image forming system, image forming apparatus, and image forming method which can be pull printed.

A typical image forming apparatus, such as an MFP (Multifunctional Peripheral), which can print a document and an image, is known. An image forming system including an image forming apparatus and a server and can pull print is also present. In such system, document data printed by a user is once accumulated in the server. Then, the user can select the document data in an operation panel part of the image forming apparatus, and the document can be printed. On the other hand, a typical system that manages scanned data with divided memory storage when scanning a document is also known.

SUMMARY

An image forming system of the present disclosure is an image forming system having a transmitting apparatus, a preserving apparatus, and an output apparatus and allows to pull print, including: the transmitting apparatus includes: a division part configured to generate a blockchain of a document data by generating identification information of the document data for the pull print, by dividing into blocks, and by calculating and including a previous hash value of a previous block in order, and a storing and transmitting part configured to transmit each of the blocks divided by the division part to at least two of the preserving apparatuses; the preserving apparatus includes: a storing part configured to store a block received from the transmitting apparatus, and an outputting and transmitting part configured to transmit the block stored in the storing part according to the instructions from the output apparatus; and the output apparatus includes: an identification information acquisition part configured to acquire the identification information of the document data, a block acquisition part configured to acquire each of the block of the document data corresponding to the identification information acquired by the identification information acquisition part from any one of the preserving apparatuses, a document reproduction part configured to pack each of the block acquired by the block acquisition part and reproduce to the document data, and an image forming part configured to output the document data reproduced by the document reproduction part.

An image forming apparatus of the present disclosure an image forming apparatus includes: an identification information acquisition part configured to acquire identification information of document data for pull print; a block acquisition part configured to acquire a block, which the document data is divided, corresponding to the identification information acquired by the identification information acquisition part from other apparatus; a document reproduction part configured to pack and decrypt each of the block acquired by the block acquisition part; an image forming part configured to output the document data decrypted by the document reproduction part.

An image forming method of the present disclosure is an image forming method executed by an image forming system having a transmitting apparatus, a preserving apparatus, and an output apparatus and allowing to pull print, and includes the steps of: by the transmitting apparatus, generating identification information of a document data for the pull print, dividing into blocks, calculating and including a previous hash value of a previous block in order, and generating a blockchain of the document data; by the transmitting apparatus, transmitting each of divided block to at least two of the preserving apparatuses; by the preserving apparatus, storing a block received from the transmitting apparatus; by the output apparatus, acquiring the identification information of the document data; by the preserving apparatus, transmitting the block stored in the preserving apparatus according to the instructions from the output apparatus; by the output apparatus, acquiring each of the block corresponding to acquired identification information from any one of the preserving apparatuses; by the output apparatus, packing each of the acquired block and reproducing to the document data; and by the output apparatus, outputting the reproduced document data.

DETAILED DESCRIPTION

Embodiment

[System Configuration of Image Forming System X]

Figure 1:
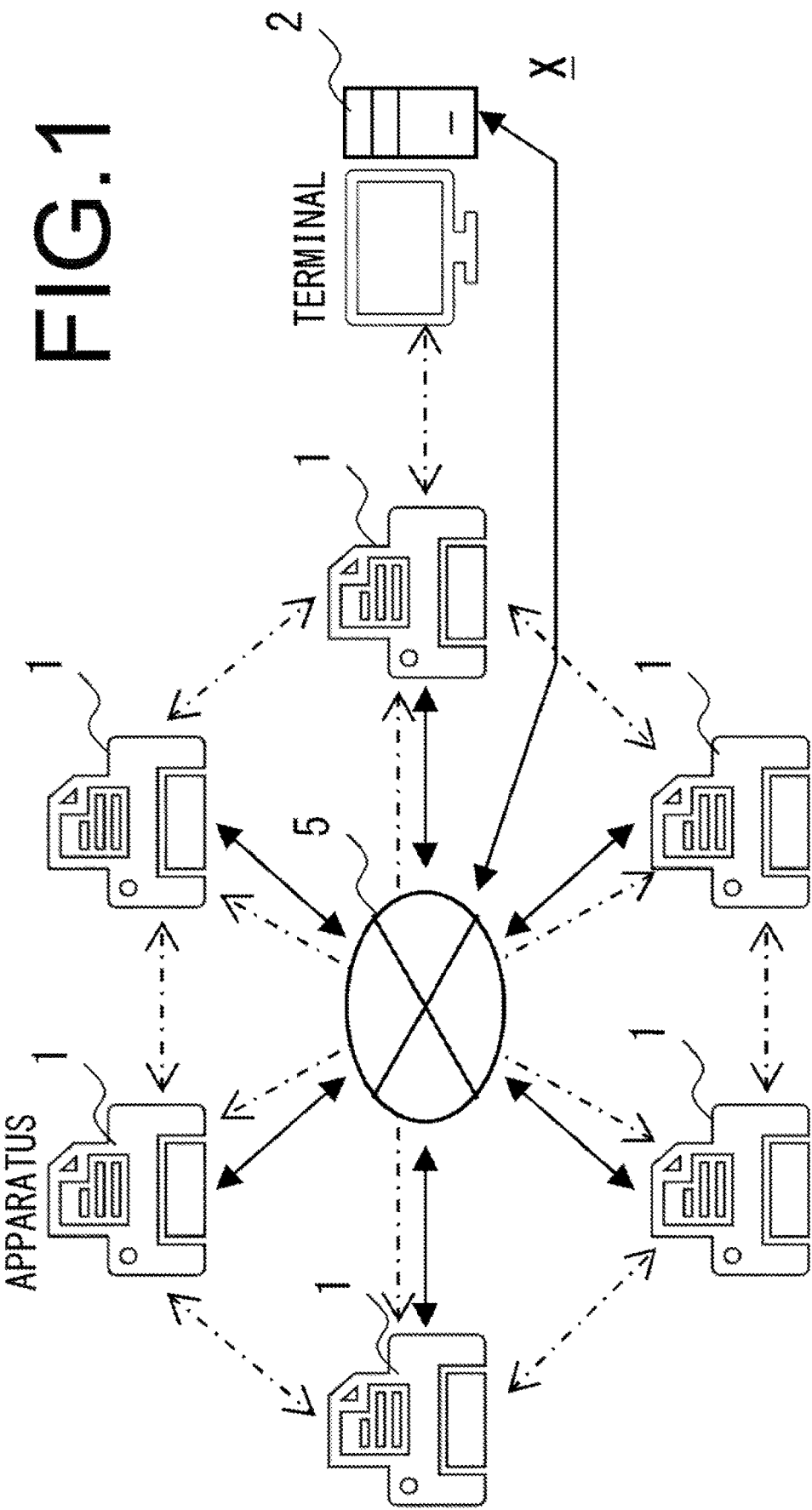
FIG. 1 is a system configuration figure of an image forming system according to an embodiment of the disclosure.
Figure 2:
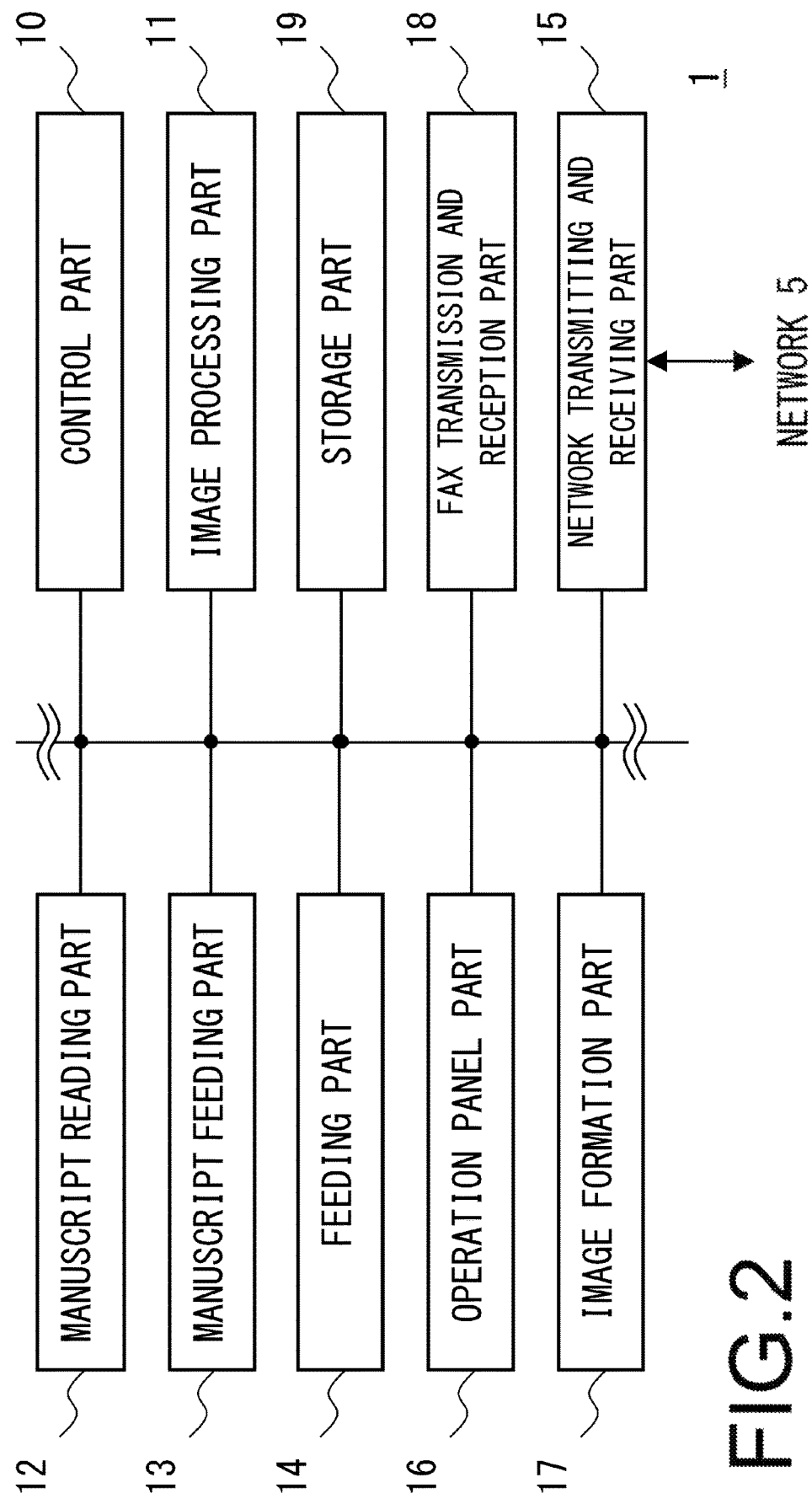
FIG. 2 is a block diagram showing a control configuration of the image forming apparatus as shown in FIG. 1.
Figure 3:
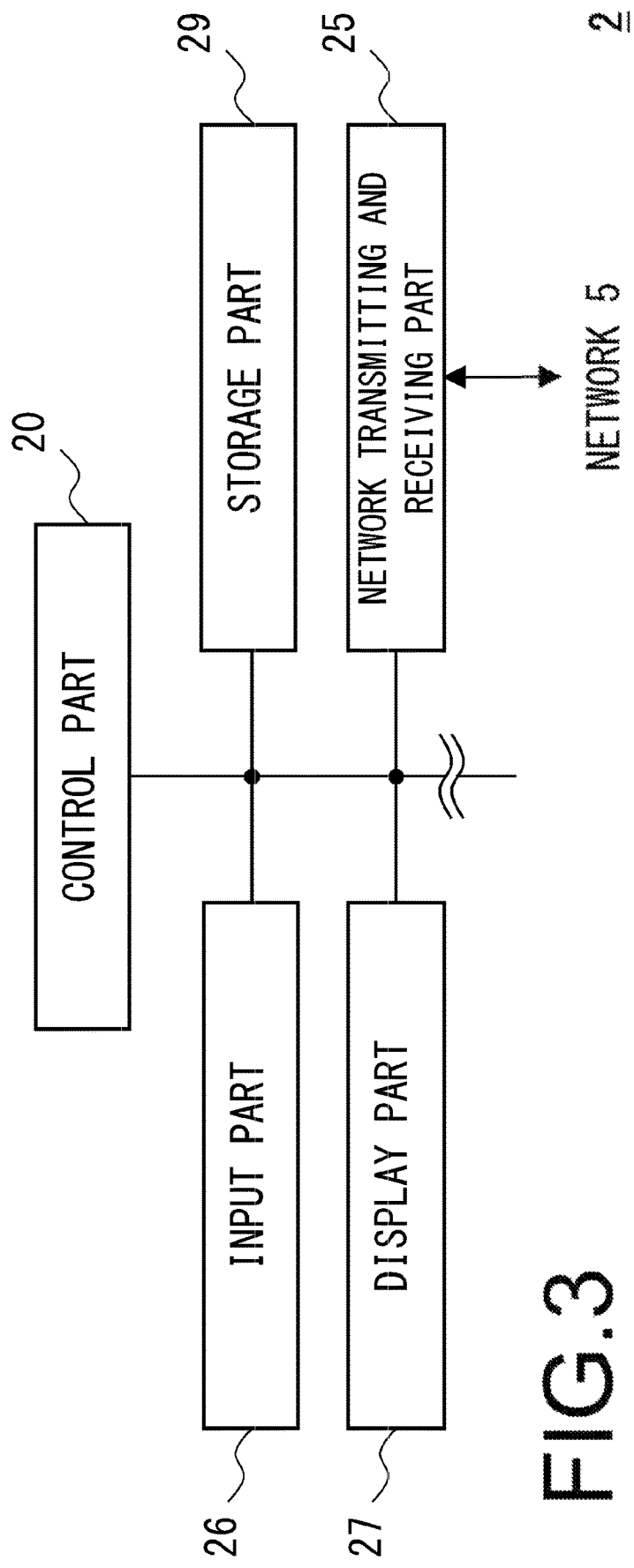
FIG. 3 is a block diagram showing a control configuration of the terminal as shown in FIG. 1.

At first, with reference to FIG. 1-FIG. 3, the system configuration of image forming system X according to the embodiment of the present disclosures is explained. Here, image forming system X of the present embodiment is a distributed type pull printing system configured with a plurality of image forming apparatuses 1 and terminal 2. In image forming system X of the present embodiment, each image forming apparatus 1 and terminal 2 are connected with network 5.

Image forming apparatus 1 is an information processing apparatus, such as an MFP, a network scanner, a document scanner, network FAX, a printer, or the like, which can transmit and receive various data. Image forming apparatus 1 can perform pull printing, direct printing, copy, scan, facsimile transmission, or the like, and can also output document data 200 (FIG. 4) created in terminal 2. In this case, in the present embodiment, image forming apparatus 1 pull prints by functioning as a transmitting apparatus, a preserving apparatus, and an output apparatus as described later.

Terminals 2 is a terminal, such as PC, a mobile phone, a smart phone, PDA (Personal Data Assistant), a business-use terminal, and a dedicated terminal, or the like. As for terminal 2, various general-purpose OS (Operating System), or the like, is operating. Also, terminal 2 can perform installation of control programs, such as a device driver for image forming apparatus 1, or the like. Thereby, it is possible to use functions such as a pull print, a direct print, a scan, FAX transmission and reception, and network FAX, or the like from OS and various application software (hereinafter, it simply refers as "application").

Network 5 is Intranet such as LAN (Local Area Network), WAN (Wide Area Network) such as the Internet, a mobile phone network, or the like. When network 5 is LAN, it may be a wireless LAN, such as WiFi, or the like. When network 5 is WAN, it may be connected with the server on a so-called "cloud" via a router, a gateway, or the like. Further, a plurality of networks may be connected to network 5 by VPN (Virtual Private Network), bridge, or the like.

Here, in the present embodiment, as shown in a dashed dotted line, each image forming apparatus 1 functions as a node of a PtP (Peer to Peer) network. In detail, the user can print document data 200 (FIG. 4) from arbitrary image forming apparatuses 1 as like a typical pull printing. However, in the present embodiment, each image forming apparatus 1 is not in the relationship as a client and a server, and it accumulates and prints data in a distributed manner. Therefore, image forming apparatus 1 functions as anyone or arbitrary combination of the transmitting apparatus, the preserving apparatus, and the output apparatus as described later.

(Configuration of Image Forming Apparatus 1)

Then, as refer to FIG. 2, a control configuration of image forming apparatus 1 is described. Image forming apparatus 1 includes control part 10, image processing part 11, manuscript reading part 12, manuscript feeding part 13, feeding part 14, network transmitting and receiving part 15, operation panel part 16, image formation part 17 (image forming part), FAX transmission and reception part 18, and storage part 19, or the like. Each part is connected to control part 10, and its operation is controlled by control part 10.

Control part 10 is an information processing part, such as GPP (General Purpose Processor), CPU (Central Processing Unit), MPU (Micro Processing Unit), DSP (Digital Signal Processor), GPU (Graphics Processing Unit), ASIC (Application Specific Processor), or the like. Control part 10 reads a control program stored in ROM and HDD of storage part 19, expands and executes the control program in RAM, and thereby is operated as each part of the functional block as described later. Also, control part 10 controls a whole apparatus corresponding to the specified instructions information inputted from terminal 2 and operation panel part 16.

Image processing part 11 is control arithmetic part, such as DSP (Digital Signal Processor) and GPU (Graphics Processing Unit), or the like. Image processing part 11 performs specified image processing for image data. The specified image processing may be a process of scaling, concentration tuning, gradation adjustment, image improvement, or the like, for example. Also, image processing part 11 stores the image read by manuscript reading part 12 as print data in storage part 19. In this case, image processing part 11 is also possible to convert the print data into an electronic filing document, such as PDF (Portable Document Format), a various file, such as a word processor and a spreadsheet, a file of image data, such as TIFF and a bitmap, or the like, (hereinafter, it simply called as PDF, or the like.).

Further, the image processing part 11 may be capable of executing at least a part of processing of OCR (Optical Character Recognition).

Manuscript reading part 12 reads a set manuscript. Also, manuscript reading part 12 is arranged on the upper part of the body part of image forming apparatus 1. Manuscript reading part 12 is provided with a scanner, platen glass, and a manuscript reading slit. Manuscript reading part 12, when reading the manuscript placed on platen glass, moves the scanner to a position which faces to platen glass, reads with scanning the manuscript placed on platen glass, acquires image data, and outputs the acquired image data to control part 10.

Also, manuscript reading part 12, when reading the manuscript fed from manuscript feeding part 13, moves the scanner to a position that faces to the manuscript reading slit. Then, manuscript reading part 12 reads the manuscript in synchronization with the manuscript feeding operation by the manuscript feeding part 13 via the manuscript reading slit and acquires the image data. Manuscript reading part 12 outputs the acquired image data to control part 10.

Manuscript feeding part 13 conveys the manuscript read by manuscript reading part 12. Manuscript feeding part 13 is arranged on the upper part of manuscript reading part 12. Manuscript feeding part 13 is provided with a manuscript mounting part and a manuscript transport mechanism. Manuscript feeding part 13 sequentially-feeds the documents placed on the manuscript mounting part one by one by the manuscript transport mechanism and feeds the documents to the document reading part 12.

Feeding part 14 feeds the recording paper one by one toward the image forming part 17. Feeding part 14 is provided in the body part.

Network transmitting and receiving part 15 is a network connection part including a LAN board, a wireless transmitter receiver, or the like, for connecting with an external network, such as LAN, wireless LAN, WAN, and a mobile phone network, or the like. Network transmitting and receiving part 15 transmits and receives data by the line for data communications and transmits and receives an audio signal by a voice call line.

Operation panel part 16 is provided with an input part, such as a button and a touch panel, or the like, and a display part, such as LCD (Liquid Crystal Display) and an organic electroluminescence display, or the like. Also, operation panel part 16 is arranged on the front-side of image forming apparatus 1. The button of the input part in operation panel part 16 is a button that perform instructions related to a numeric keypad, a start, a cancel, switching of operational mode, executing of a job, or the like. The operational mode may be provided with a type of mode of copying, FAX transmission, scanner, network scanner, or the like. Also, the job includes printing, transmission, storage, record, or the like, for the selected document. The input part of operation panel part 16 acquires instructions of the various jobs of image forming apparatus 1 by a user. Also, by user instructions acquired from operation panel part 16, it is also possible to input and change the information of each user.

Image formation part 17 is an image forming part in the present embodiment. Image formation part 17 performs the image formation from the data stored in storage part 19, read by manuscript reading part 12, or acquired from terminal 2 to a recording paper. Image formation part 17 is provided with a photo conductor drum, an exposure part, a developing part, a transfer part, a fixing part, or the like. Image formation part 17 records a toner image on a recording paper by performing an image formation process including electrification, exposure, development, transfer, and fixing.

FAX transmission and reception part 18 transmits and receives a facsimile. FAX transmission and reception part 18 performs facsimile reception from other FAX equipment by a sound line and stores it in storage part 19 and can perform image formation by image formation part 17. Also, FAX transmission and reception part 18 can convert the data of the manuscript read by manuscript reading part 12 or the data of network FAX transmitted from terminal 2 to image data and can perform facsimile transmission to other FAX equipment by the sound line.

Storage part 19 is a storage part that uses a non-transitory recording medium. Storage part 29 may include, for example, various RAM (Random Access Memory) as a main memory part. Also, storage part 29 may include, for example, ROM (Read Only Memory), eMMC (embedded Multi Media Card), SSD (Solid State Drive), HDD (Hard Disk Drive), or the like, as an auxiliary memory part. The main memory part of storage part 19 may keep memory contents by function, such as self refreshing, or the like, when being a power saving state. The control program for operation-controlling image forming apparatus 1 is stored in the auxiliary memory part of storage part 19. In addition, storage part 19 has also stored a user account setting. Also, the area of the storage folder for each user may be included in storage part 19.

In image forming apparatus 1, control part 10 and image processing part 11 may be integrally-formed as like CPU with built-in GPU, a chip-on module package, SOC (System On a Chip), or the like. Also, control part 10 and image processing part 11 may include built-in RAM, ROM, flash memory, or the like.

(Configuration of Terminal 2)

Then, as refer to FIG. 3, a configuration of terminal 2 is described. Terminal 2 is provided with control part 20, network transmitting and receiving part 25, input part 26, display part 27, storage part 29, or the like.

Control part 20 is an information processing part, such as GPP, CPU, MPU, DSP, GPU, ASIC, or the like.

Input part 26 is a keyboard, various sensors, a pointing device, or the like, for acquiring the various instructions by the user. The pointing device includes a touch panel, a digitizer, a touchpad, or the like. Input part 26 can make various instructions input by a user by using GUI (Graphical User Interface) on OS and can acquire it. Also, by instructions inputted by the user in input part 26, it is also possible to process the generation or transmission of document data 200 (FIG. 4), to input or change the information of each user, or the like.

Display part 27 is a flat display panel, such as LCD, an organic electroluminescence display, FED, and a fluorescent display tube, a projector, LED for status displays, or the like. Display part 27 can display the various operation screens associating with GUI. In addition, input part 26 and display part 27 may be integrally-formed as like a display with a touch panel or a digitizer, or the like.

Network transmitting and receiving part 25 is a network connection part including a LAN board, a wireless transmitter receiver, or the like, for connecting with network 5.

Storage part 29 is a storage part that uses a non-transitory recording medium. Storage part 29 may include RAM, ROM, eMMC, SSD, HDD, or the like. Also, storage part 29 may include an external storage, such as various flash memories, an optical recording medium, or the like. Also, storage part 29 may store a serial number or unique ID for specifying the self-apparatus, versions of OS, firmware, and a device driver, or the like, and an apparatus ID, which is an IP address, a MAC Address, or the like.

Also, a control program for operation-controlling terminal 2 is stored in the auxiliary memory part of storage part 29. In the control program, a programs and data, which is OS, various applications, or the like, are included. Also, the control program includes a middleware that works on OS, the device driver that controls image forming apparatus 1, or the like.

In addition, control part 20 may have built-in RAM, ROM, a flash memory, or the like. Also, control part 20 reads the control program stored in storage part 29, expands the control program, executes it, and thereby operates as each part of the functional block as described later.

[Functional Configuration of Image Forming System X]

Figure 4:
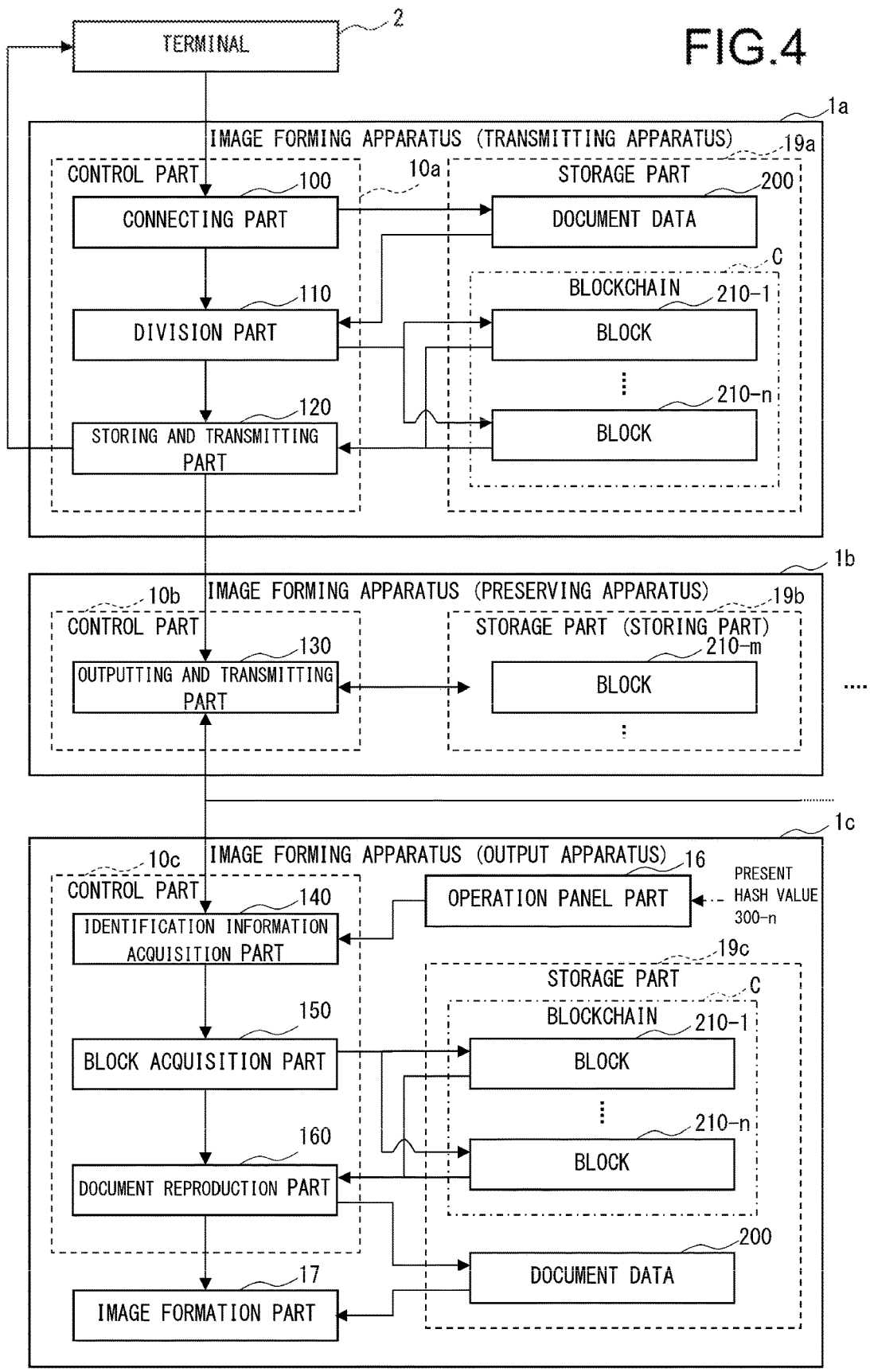
FIG. 4 is a block diagram showing a functional configuration of the image forming system according to an embodiment of the disclosure.

Here, with reference to FIG. 4, the functional configuration of system X according to the embodiment of the present disclosures is explained. In image forming system X of the present embodiment, when document data 200 is printed by the user in terminal 2, any one or arbitrary combination of a plurality of image forming apparatus 1 function as a transmitting apparatus, a preserving apparatus, and an output apparatus, and a pull-print is performed.

In these apparatuses, the transmitting apparatus acquires document data 200 from terminal 2, divides the document data 200 into blockchain C, and transmits the block in blockchain C to the preserving apparatus. The preserving apparatus stores any one of each block 210 of blockchain C and transmits it with the instructions from the output apparatus. The output apparatus, when the user selects printed document data 200 from operation panel part 16, acquires each block 210 from a preserving apparatus, reproduces to document data 200, and prints it. In the present embodiment, an example that image forming apparatus 1*a* is a transmitting apparatus, image forming apparatus 1*b* is one of the preserving apparatuses, and image forming apparatus 1*c* is an output apparatus is explained.

Control part 10*a* of image forming apparatus 1*a* is provided with connecting part 100, division part 110, and storing and transmitting part 120. Storage part 19*a* stores document data 200 and block 210-1-block 210-*n*. Control part 10*b* of image forming apparatus 1*b* is provided with outputting and transmitting part 130. Storage part 19*b* stores block 210-*m*. Control part 10*c* of image forming apparatus 1*c* is provided with identification information acquisition part 140, block acquisition part 150, and document reproduction part 160. Further, image forming apparatus 1*c* is provided with image formation part 17. Storage part 19*c* stores block 210-1-block 210-*n*, and document data 200. The data stored in storage part 19*a*, storage part 19*b*, and storage part 19*c* may be changed with stages of a process.

Connecting part 100 acquires document data 200 for pull print, which is printed on terminal 2 and stores it in storage part 19*a*.

Division part 110 creates identification information 400 of document data 200 stored in storage part 19*a*. In the present embodiment, division part 110 acquires the hash value of the encrypted overall document data 200. This encryption is performed by using a public key encryption or a secret key cryptosystem, for example. Then, division part 110 divides document data 200 into block 210-1-block 210-*n*. In this case, division part 110 creates blockchain C of document data 200 by calculating and including previous hash value 320 of previous block 210 in order.

Storing and transmitting part 120 transmits each of block 210-1-block 210-*n* divided by division part 110 to at least two of preserving apparatuses. In this case, storing and transmitting part 120 decreases priority of transmission of block 210 to the preserving apparatus that is likely to be in an offline state. On the contrary, storing and transmitting part 120 increases the priority of transmission of block 210 to the preserving apparatus that has high processing capacity and/or new installation years. Further, storing and transmitting part 120 suppresses transmission of block 210 to the preserving apparatus that is expected to be in error. In addition, storing and transmitting part 120 can also indicate the hash value of document data 200 to the user as identification information 400.

Outputting and transmitting part 130 stores block 210-m, which is received from transmitting apparatus and is either block 210-1-block 210-n, in storage part 19b. That is, in the present embodiment, storage part 19b functions as a storing part. Outputting and transmitting part 130 transmits block 210-m stored in storage part 19b by instructions from the output apparatus.

Identification information acquisition part 140 acquires identification information 400 of document data 200. In the present embodiment, identification information acquisition part 140 acquires identification information 400 inputted from operation panel part 16.

Block acquisition part 150 acquires each block 210 of document data 200, which corresponds to identification information 400 acquired by identification information acquisition part 140, from any one of the preserving apparatuses and stores it in storage part 19c. In this case, block acquisition part 150 calculates previous hash value 320, repeatedly, and acquires right block 210. This process is performed from the last block 210-n of blockchain C in order to block 210-1.

Document reproduction part 160 packs each block 210 acquired by block acquisition part 150 and reproduces to document data 200. In the present embodiment, document reproduction part 160 transmits to image formation part 17 and make image formation of the reproduced document data 200 perform and printout.

Document data 200 is, for example, a file of a "job" for a pull print, which is specified as "pull print" in a setting of the device driver and is printed from the application of terminal 2. Document data 200 may be written, for example, by using PDL (Page Description Language), or the like. Otherwise, document data 200 may be, for example, a file of electronic document data, such as PDF, a word processor, or a spreadsheet, various image data, or the like. Further, document data 200 may be encrypted in the present embodiment.

Block 210-1, . . . , block 210-m, . . . , block 210-n are blocks of the data that configures blockchain C. Hereinafter, when referring to any one of these, simply referred to as block 210.

Figure 5:
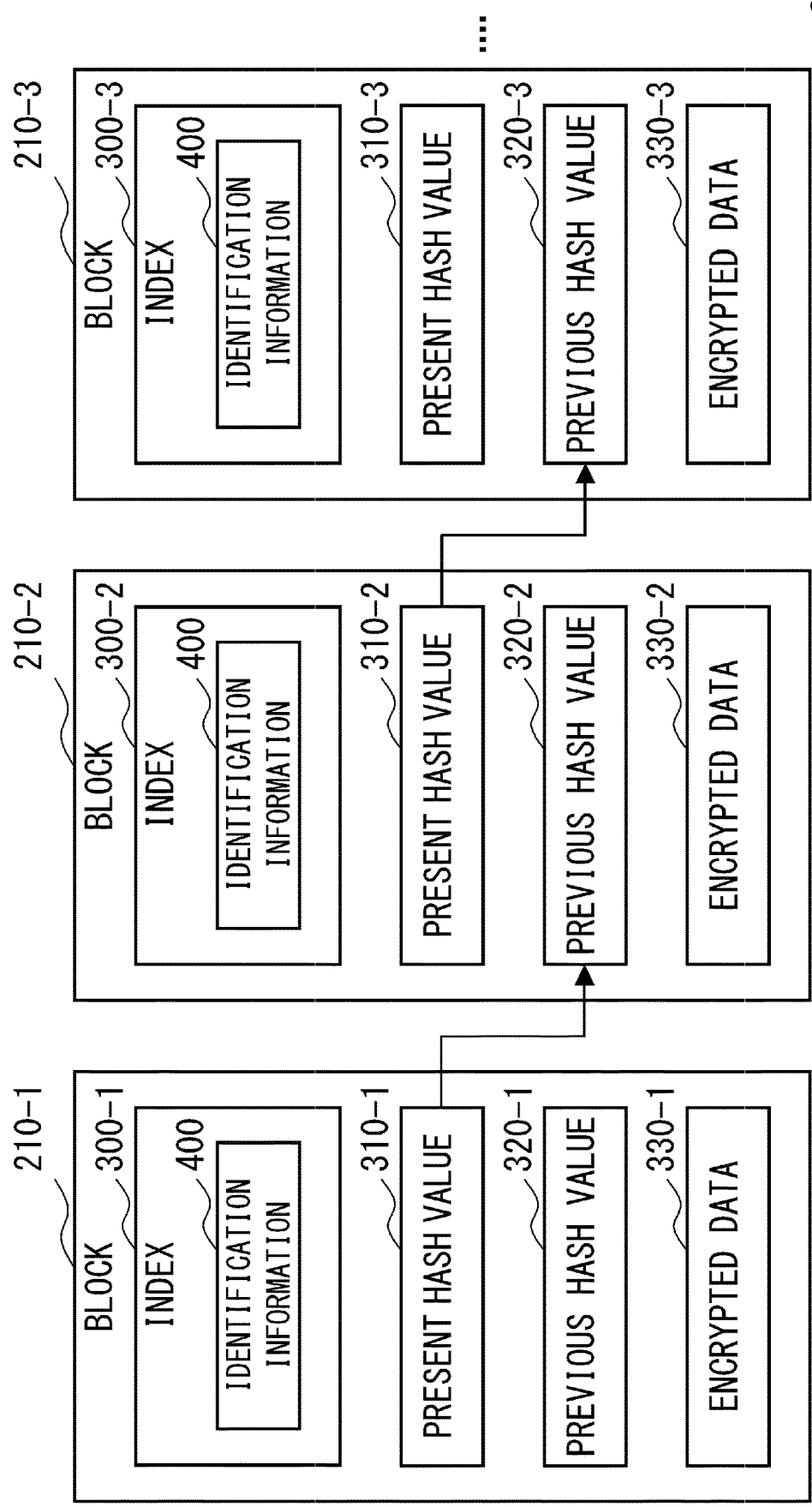
FIG. 5 is a block diagram showing a detailed configuration of the blockchain as shown in FIG. 4.

FIG. 5 explains the details of blockchain C. Each block 210 includes index 300, present hash value 310, previous hash value 320, and encrypted data 330, or the like.

Index 300 is header data of each block 210, or the like. The header data includes data of, for example, an identifier showing as block 210 of image forming system X, a number of the arrangement order of each block 210, each definition of a data structure, encryption method, or the like. In addition, index 300 includes identification information 400. Identification information 400 is, for example, the hash value of encrypted document data 200. That is, in the present embodiment, the hash value of the file in the state before document data 200 is encrypted and being divided into block 210 is used as identification information 400. The hash value can be calculated by various hash functions, such as generating a bit string of fixed length without regularity from a bit string of arbitrary length. The following hash value is calculated by a similar kind of hash function.

The present hash value 310 is a hash value of encrypted data 330 of this block 210. Otherwise, present hash value 310 may be a calculated entire hash value of this block 210.

Previous hash value 320 is a hash value of encrypted data 330 of previous block 210. This value is, for example, in the arrangement order included in index 300, it may be the present hash value 310 of previous block 210 is copied and stored. That is, as shown in FIG. 5, previous hash value 320 of block 210-2 is equivalent to the present hash value 310-1 of block 210-1, and previous hash value 320 of block 210-3 is equivalent to the present hash value 310-2 of block 210-2. Here, as for previous hash value 320 of block 210-1, specified numbers and unfixed numbers, such as "0", or the like, may be included, for example.

Encrypted data 330 is a main part of the data in which encrypted document data 200 is divided.

Here, among blocks 210, as for first block 210-1 and/or the last block 210-n, data other than these may be added.

Here, control part 10a of image forming apparatus 1a is functioned as connecting part 100, division part 110, and storing and transmitting part 120 by executing the control program stored in storage part 19a. Control part 10b of image forming apparatus 1b is functioned as outputting and transmitting part 130 by executing the control program stored in storage part 19b. Control part 10c of image forming apparatus 1c is functioned as identification information acquisition part 140, block acquisition part 150, and document reproduction part 160 by executing the control program stored in storage part 19c. In addition, each part of above-mentioned image forming apparatus 1 serves as hardware resources that execute the image forming method in the present disclosure. Further, the above-mentioned part or arbitrary combination of a functional configuration may be configured as like in hardware with an IC, a programmable logic, FPGA (Field-Programmable Gate Array), or the like.

Figure 6:
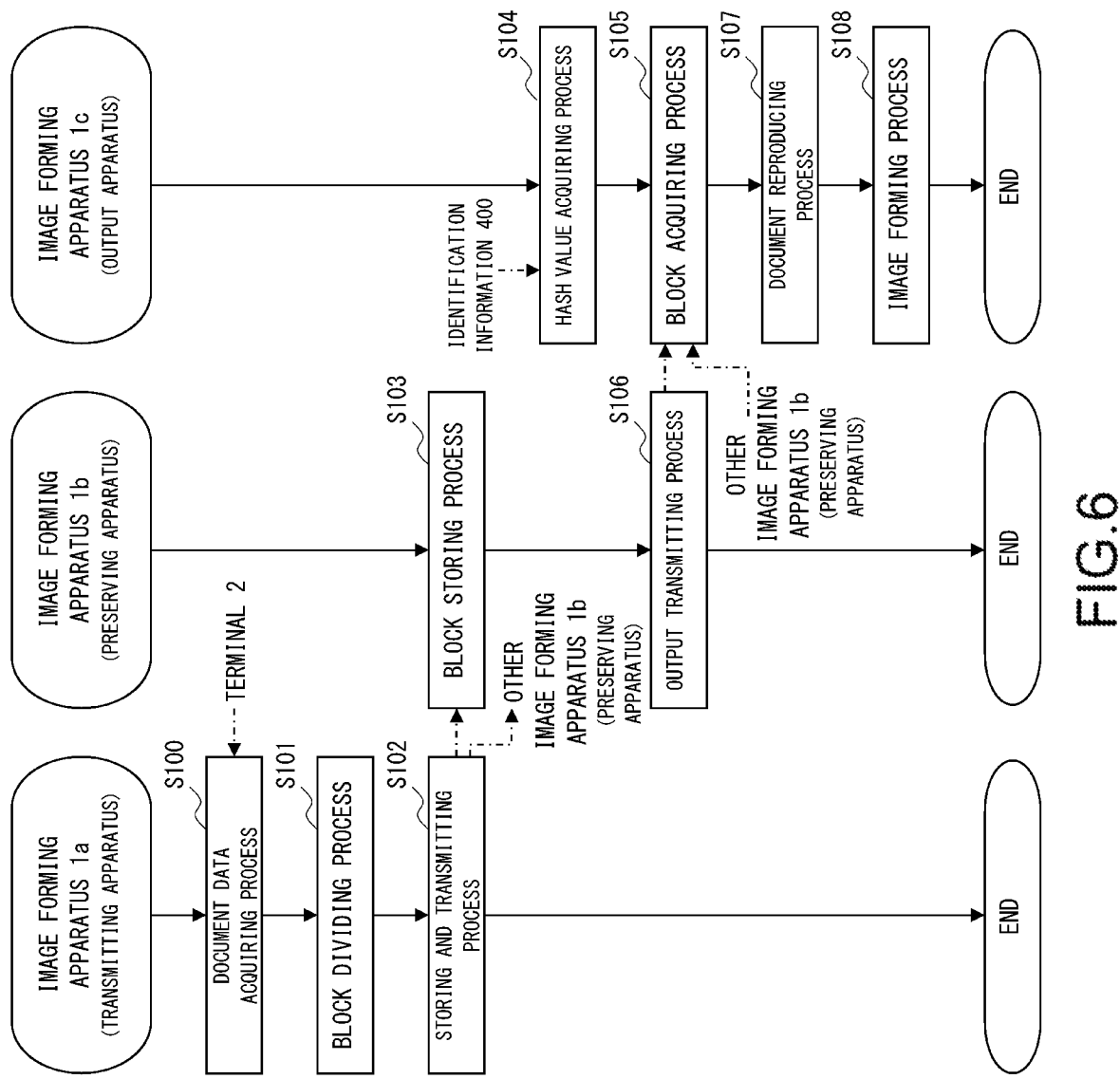
FIG. 6 is a flowchart of a distributed process according to the embodiment of the present disclosures.

[Distributed pull print printing process by image forming system X] Then, with reference to FIG. 6, the distributed pull print process by image forming system X according to an embodiment of the disclosure is explained. In image forming system X of the present embodiment, each image forming apparatus 1 pull prints as mentioned above as image forming apparatus 1a (transmitting apparatus), image forming apparatus 1b (preserving apparatus), and image forming apparatus 1c (output apparatus). In this case, blockchain C is generated from document data 200 in image forming apparatus 1a. Then, image forming apparatus 1a transmits block 210 to image forming apparatus 1b and makes it store. In image forming apparatus 1c, when a user inputs the hash value of document data 200, each block 210 is acquired from the preserving apparatus, document data 200 is reproduced, collectively, and it is printed. In the distributed pull print process of the present embodiment, control part 10 of each image forming apparatus 1 collaborates with each part and executes the program stored in storage part 19 by using hardware resources. In the following, with reference to the flow chart of FIG. 6, the details of a distributed pull print process are explained for each step.

(Step S100)

Firstly, connecting part 100 of image forming apparatus 1a (transmitting apparatus) performs a document data acquiring process. In the various applications of terminal 2, a user creates document data 200 and designates a pull print on the device driver. Then, terminal 2 encrypts the respective document data 200 with a public key or a secret key, and terminal 2 transmits it to image forming apparatus 1. In this case, transmitted destination is, for example, either of image forming apparatus 1 specified by the user, image forming apparatus 1 most frequently used by the user, the nearest image forming apparatus 1 on network 5, or the like. Then, image forming apparatus 1 that document data 200 is transmitted functions as image forming apparatus 1*a*, which is the transmitting apparatus of the present embodiment. Connecting part 100 of this image forming apparatus 1*a*, when document data 200 is acquired, stores it in storage part 19*a*, temporarily.

(Step S101)

Then, division part 110 performs block dividing process. Here, division part 110 creates identification information 400 of document data 200 and stores it in storage part 19*a*, temporarily. In the present embodiment, the identification information 400 is an entire hash value of encrypted document data 200 (the hash value of document data 200).

Then, division part 110 divides document data 200 into blockchain C. Division part 110 divides document data 200 into a plurality of blocks 210-1-block 210-*n*. As the size of each block 210, for example, a fixed value, such as 128 KB (kilobyte), 256 KB, 512 KB, or the like, is used. Otherwise, the size of each block 210 may be variable depending on the total number of the image forming apparatuses 1, which configures the image forming system X, or the like.

Then, division part 110 divides encrypted document data 200 into encrypted data 330 corresponding to the size of this block 210 and includes in it. Further, division part 110 calculates the present hash value 310 about encrypted data 330 of each block 210 and includes in it. About each block 210, division part 110 includes previous hash value 320 of previous block 210 in order and thereby generates blockchain C of document data 200. That is, block 210-1-block 210-*n* are connected by previous hash value 320 and thereby are configured as blockchain C.

(Step S102)

Then, storing and transmitting part 120 performs a storing and transmitting process. Storing and transmitting part 120 transmits each of divided block 210-1-block 210-*n* to image forming apparatus 1*b* (preserving apparatus), which each of them serves as a different node. Here, each block 210 is stored in at least two of image forming apparatuses 1*b* in the present embodiment. This is for making a response possible when reaching of the preserving apparatus that stores block 210 become impossible or off-line. In detail, storing and transmitting part 120 decreases the priority of transmission of block 210 to the preserving apparatus susceptible to be in an offline state. Storing and transmitting part 120 increases the priority of transmission of block 210 to a preserving apparatus that has high processing capacity and/or new installation years. In addition, storing and transmitting part 120 suppresses transmission of block 210 to the preserving apparatus that is expected to be in error. Thus, each block 210 of blockchain C is transmitted to each image forming apparatus 1*b*, which is a node configuring image forming system X. Thereby, encrypted document data 200 is distributed and is held.

Then, storing and transmitting part 120 transmits identification information 400 to terminal 2. Identification information 400 is received from image forming apparatus 1*a*, and terminal 2 indicates it to the user. In an example of the present embodiment, terminal 2 displays the hash value of document data 200 on display part 27 as identification information 400. The hash value of this document data 200, as described later, serves as key data at the time of outputting document data 200 for pull printing in image forming apparatus 1*c*, which becomes as the output apparatus.

(Step S103)

Then, outputting and transmitting part 130 of image forming apparatus 1*b* (preserving apparatus) performs a block storing process. Here, process in one of image forming apparatus 1*b* is explained. Outputting and transmitting part 130 receives block 210-*m* from transmitting apparatus and stores it in storage part 19*b* (storing part). Here, the block 210-*m* may be plural and its order on index 300 may also not be in order.

(Step S104)

Here, identification information acquisition part 140 of image forming apparatus 1*c* (output apparatus) performs a hash value acquiring process. If the user inputs identification information 400 on operation panel part 16, identification information acquisition part 140 recognizes it as for document data 200 to pull print. In the present embodiment, identification information acquisition part 140 acquires the hash value of document data 200. The hash value of document data 200 is used in order to acquire blockchain C and to reproduce document data 200 as explained as follows.

(Steps S105 and S106)

Then, in the output apparatus, block acquisition part 150 acquires each block 210 corresponding to the acquired hash value from any one of the preserving apparatuses and stores it in storage part 19*c*. In this case, block acquisition part 150 acquires block 210 by a reverse order from last to a first in order of index 300. That is, in the example of the present embodiment, from block 210-*n* to block 210-1 are acquired. Therefore, block acquisition part 150 performs broadcasting, or the like, to network 5. Thereby, it is instructed to transmit block 210-*m* for acquiring.

Here, outputting and transmitting part 130 of image forming apparatus 1*b* (preserving apparatus) performs an output transmitting process. By the instructions from image forming apparatus 1*c* that is the output apparatus, outputting and transmitting part 130 transmits block 210-*m* stored in storage part 19*b* to the respective image forming apparatus 1*c*. Block acquisition part 150 of image forming apparatus 1*c* acquires this block 210-*m*. Block acquisition part 150 calculates the present hash value 310 of encrypted-data 330-*m* of the respective block 210-*m*, again. Then, block acquisition part 150 checks that it is the same and right as the previous hash value 320 of block 210 in the following order. If these values are different, block acquisition part 150 determines that block 210 is altered or damaged data. In this case, block acquisition part 150 may acquire right block 210-*m* again or may set as an error. If right block 210-*m* is acquired, block acquisition part 150 repeats and receives previous block 210. That is, block acquisition part 150 acquires each block 210 from the node that stores the requested block 210. Thereby, blocks 210 of the overall blockchain C are acquired.

(Step S107)

If document reproduction part 160 of image forming apparatus 1*c* (output apparatus) acquires all blocks 210 of blockchain C, a document reproducing process is performed. Document reproduction part 160 reproduces document data 200 by packing each of acquired blocks 210. In this case, document reproduction part 160 combines and decrypts encrypted data 330 of each block 210, generates document data 200 in the state where it is not encrypted, and stores it in storage part 19*c*.

(Step S108)

Then, document reproduction part 160 and image formation part 17 perform an image formation process. Document reproduction part 160 makes reproduced document data 200 output to a recording paper by image formation part 17. Thereby, the reproduced document data 200 can be output. Otherwise, document reproduction part 160 can convert document data 200 into files, such as PDF, perform FAX transmission, transmit it by e-mail or a messenger, or the like. As the above-mentioned, the distributed pull print printing process according to the embodiment of the present disclosure is ended.

The following effects can be obtained as configured as mentioned above. Typically, in the pull print, client server environment is required. That is, a server that accumulates document data acquired from a terminal and transmits it to an image forming apparatus is required. In addition, the typical network scanning system manages scanned data in divided memory storage. However, this system cannot support pull printing. On the other hand, image forming system X according to an embodiment of the disclosure includes image forming apparatus 1a (transmitting apparatus), a plurality of image forming apparatuses 1b (preserving apparatus), and image forming apparatus 1c (output apparatus), and it can be pull printed. Image forming apparatus 1a is provided with division part 110 and storing and transmitting part 120. Division part 110 is the blockchain of document data 200 by generating identification information 400 of document data 200, by dividing into blocks 210, and by calculating and including previous hash value 320 of previous block 210 in order. Storing and transmitting part 120 transmits each of block 210 divided by division part 110 to at least two of image forming apparatus 1b. Image forming apparatus 1b is provided with storage part 19b (storing part) and outputting and transmitting part 130. Storage part 19b (storing part) stores block 210 received from image forming apparatus 1a. Outputting and transmitting part 130 transmits block 210 stored in storage part 19b according to the instructions from image forming apparatus 1c. Image forming apparatus 1c is provided with identification information acquisition part 140, block acquisition part 150, document reproduction part 160, and image formation part 17. Identification information acquisition part 140 acquires identification information 400 of document data 200. Block acquisition part 150 acquires each block 210 of document data 200 corresponding to identification information 400 acquired by identification information acquisition part 140 from any one of a plurality of image forming apparatuses 1b. Document reproduction part 160 packs each block 210 acquired by block acquisition part 150 and reproduces to document data 200. Image formation part 17 outputs document data 200 reproduced by document reproduction part 160. As configured in this way, a distributed type image forming system for pull printing, which does not need a server can be provided. That is, client server environment is unnecessary, and a distributed image forming system can be constructed. As a result, printing by pull print can be achieved anywhere.

In a typical image forming system, because document data is obtained from a server and is pull printed, the server should be reached from the image forming apparatus to print. On the other hand, image forming system X of the present embodiment, if terminal 2 for a user is connectable with image forming apparatus 1a (transmitting apparatus), image forming apparatus 1a and image forming apparatus 1b (preserving apparatus) are connectable, and image forming apparatus 1b and image forming apparatus 1c (output apparatus) are connectable, can pull print document data 200. That is, it is not necessary for all the apparatuses to be reachable via the network 5 at once. Therefore, a pull print can be realized without changing network structure. Furthermore, even in an environment where only specific apparatuses are bridge-connected via a WAN, or the like, pull printing becomes possible from the output apparatus in a remote place.

In addition, in image forming system X of the present embodiment, since blocks 210 are collected from a plurality of preserving apparatuses serving as nodes, band width and time can be reduced rather than collecting blocks 210 via a server, and also cost can be reduced. Further, in the present embodiment, block 210 is stored and held such that document data 200 is distributed as blockchain C across different nodes, entirely. For this reason, it is difficult to change or hack document data 200. That is, the accuracy of document data 200 can be guaranteed.

Furthermore, in a typical technology, the time to complete printing is influenced depending on a state of a server. On the other hand, in image forming system X of the present embodiment, block 210 is preserved with a plurality of the preserving apparatuses serving as nodes. Therefore, even if one preserving apparatus is off-line or operation is slow in a busy state, block 210 can be acquired from the preserving apparatus that can transmit quickly. Therefore, there is a high possibility that document data 200 can be pull printed in a short time. As for image forming system X of the present embodiment, except transmitting apparatus, reproduction of block 210 is not performed and a copy, or the like, are not performed after transmission. Therefore, even if it is distributed type, the band width and the storage capacity of the preserving apparatus becomes reducible.

In image forming system X according to the embodiment of the disclosure, storing and transmitting part 120 decreases the priority of transmission of block 210 to image forming apparatus 1b that is likely to be in an offline state, increases the priority of transmission of block 210 to image forming apparatus 1b that has high processing capacity and/or new installation years, and suppresses transmission of block 210 to image forming apparatus 1b that is expected to be in error. As configured in this way, block 210 can be store in image forming apparatus 1b, which is a preserving apparatus, certainly, and possibility that image forming apparatus 1c as the output apparatus acquires the blockchain, quickly, is increased. Therefore, document data 200 can be pull printed, certainly.

In image forming system X according to the embodiment of the present disclosures, block acquisition part 150 calculates previous hash value 320 from last block 210 in the order, repeatedly, and acquires right block 210. As configured in this way, even if block 210 is altered, or data is corrupted, it can be confirmed with a hash value. Accordingly, even if illegal block 210 is mixed, an alteration, hacking, or the like, of document data 200 can be prevented.

In image forming system X according to the embodiment of the present disclosures, transmitting apparatus is an image forming apparatus, and storing and transmitting part 120 indicates a hash value of document data 200 to a user. As configured in this way, the user can acquire the hash value of document data 200 as identification information 400 just by printing to the image forming apparatus. Then, document data 200 can be easily outputted by pull print only by the user inputting this on the image forming apparatus as an output apparatus.

Other Embodiments

Figure 7:
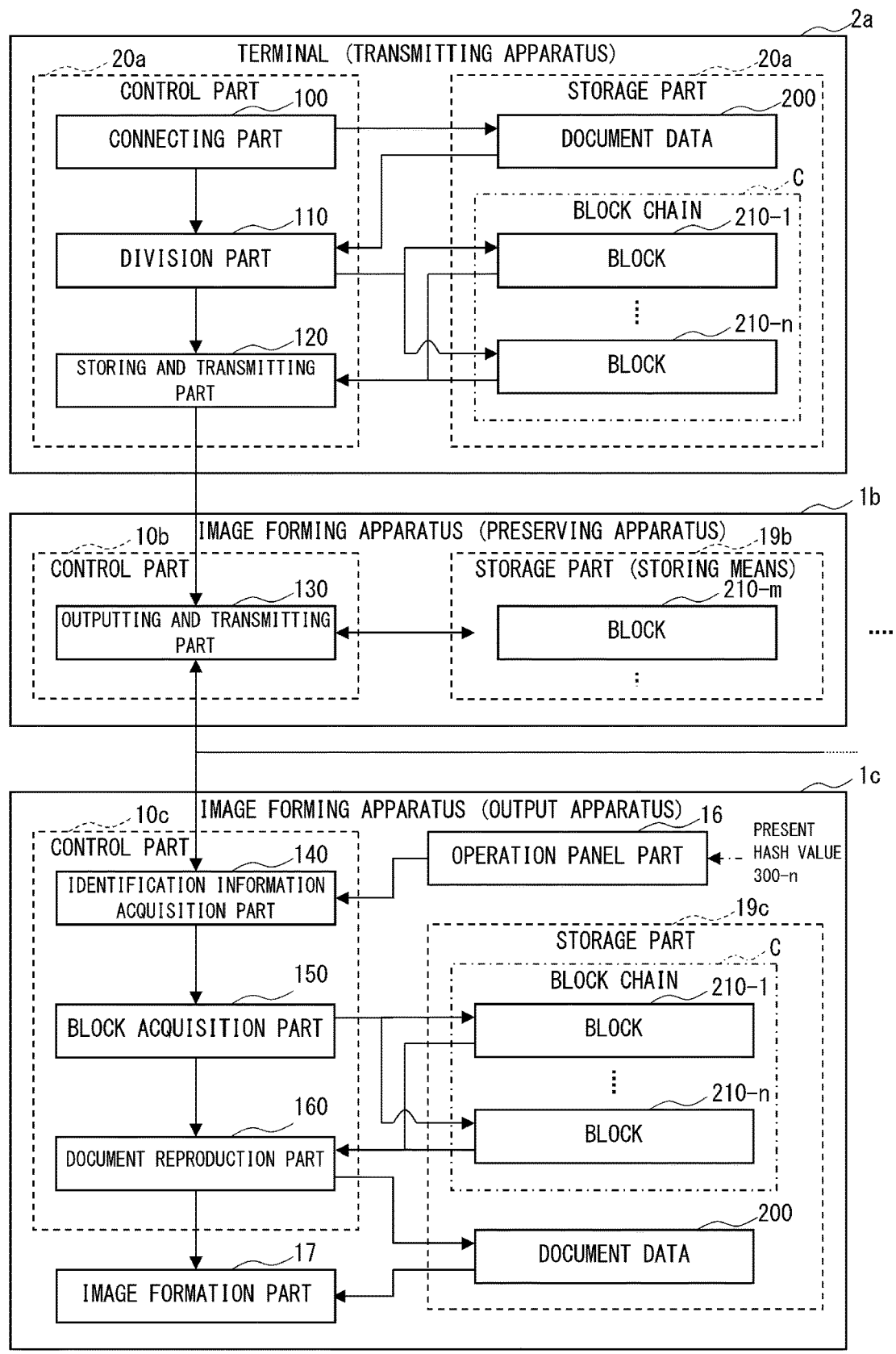
FIG. 7 is a block diagram showing a functional configuration of an image forming system according to another embodiment the present disclosure.

In addition, in the above-mentioned embodiment, it is written of an example that divides document data 200 into a blockchain and transmits by using image forming apparatus 1a as a transmitting apparatus. However, as shown in FIG. 7, instead of image forming apparatus 1a, terminal 2 may perform a process that divides document data 200 into blocks 210 and transmits each of them to image forming apparatus 1b serving as a preserving apparatus. Thereby, there becomes no need to process the document data 200 in image forming apparatus 1a, and the processing load of the image forming apparatus 1 can be reduced. Further, there becomes unnecessary to transmit and receive the hash value of document data 200 between image forming apparatus 1a and terminal 2 and can reduce a network transmission burden and processing burden. Also, if terminal 2 is moved, it is possible to configure to connect with image forming apparatus 1b in various positions. As configured in this way, the dispersibility of block 210 increases, and it can improve a possibility of reconstructing document data 200 from blockchain C.

Furthermore, in the above-mentioned embodiment, an example by using the hash value of entire document data 200 as identification information 400 of document data 200. However, the hash value of last block 210 of a blockchain may be sufficient as identification information 400 of document data 200. In this case, according to FIG. 2 and FIG. 3, present hash value 310-n of block 210-n is possible to use as identification information 400. As configured in this way, identifying block 210-n is easier, and a possibility to acquire blockchain C, quickly, increases. Also, because the order, or the like, is not necessary to be described in the index 300 of each block 210, estimating the length of blockchain C is difficult, hacking, or the like, becomes difficult.

Otherwise, identification information 400 of document data 200 may also include a character string including a user ID and date, other ID, or the like. In this case, the user data may be included in index 300 of block 210 of blockchain C or document data 200. As configured in this way, if a user only logs in with image forming apparatus 1c (output apparatus), blockchain C can be designated. Accordingly, it becomes unnecessary to input identification information 40, separately. In addition, identification information 400 of document data 200 may be a simple unique character string, key information of a random number, or the like.

In the above-mentioned embodiment, an example that document data 200 is encrypted and transmitted in terminal 2 is shown. However, document data 200 does not need to be encrypted. Even in such a case, each block 210 may include encrypted data 330. If document data 200 is not encrypted, identification information 400 itself may be encrypted and added to document data 200. Division part 110 may acquire a hash value before document data 200 is encrypted. In addition, previous hash value 320 of block 210-1 may be setup, for example, the hash value of entire document data 200 in an unencrypted state. As configured in this way, the various pull print configuration can be supported.

The above-mentioned embodiment is written that user identification information 400 is shown in terminal 2. However, identification information 400 may be indicated on the display part of operation panel part 16 in image forming apparatus 1a, or identification information 400 may be printed in image formation part 17. As configured in this way, identification information 400 can be obtained at the same time when another printed matter, or the like, is directly printed by image forming apparatus 1a, or the like. Accordingly, convenience can be improved. Further, a configuration in which the document data 200 is pull printed by inputting identification information 400 by directly connecting the terminal 2 to the output apparatus with short-distance radio, USB, or the like, is also possible.

In the above-mentioned embodiment, an example that storing and transmitting part 120 of image forming apparatus 1a, which is transmitting apparatus, transmits block 210 only to image forming apparatus 1b selected as a preserving apparatus is explained. However, storing and transmitting part 120 can transmit block 210 also to image forming apparatus 1, which is not selected as image forming apparatus 1b. In addition, division part 110 may be broadcast to all the image forming apparatuses 1 about blockchain C having been generated. As configured in this way, even if block 210 is not stored in each image forming apparatus 1 serving as each node of image forming apparatus X, the existence of block 210 itself is recordable for a history, or the like. Furthermore, a configuration that each image forming apparatus 1 keeps the information of transmitting blockchain C of encrypted document data 200 as like a server for a typical pull print is possible. As configured in this way, the history about pull print of document data 200 becomes easy to check, and security can be improved.

Also, present disclosure is applicable to information processing apparatus other than an image forming apparatus. That part, for example, it may be a configuration by using a network scanner, a server connected with a scanner, separately, by USB, or the like.

Also, the configuration and operation of the above-mentioned embodiment are an example, and it cannot be over-emphasized that it can change suitably and can perform in the range which does not deviate from the aim of the present disclosure.

What is claimed is:

1. An image forming system having a transmitting apparatus, a plurality of preserving apparatuses, and an output apparatus and allows to pull print, the transmitting apparatus comprising:
a division part configured to generate a blockchain of a document data by generating identification information of the document data for the pull print, by dividing into blocks, and by calculating and including a previous hash value of a previous block in order, and
a storing and transmitting part configured to transmit each of the blocks divided by the division part to at least two of the plurality of preserving apparatuses;

each of the plurality of preserving apparatuses comprising:
a storing part configured to store a block received from the transmitting apparatus, and
an outputting and transmitting part configured to transmit the block stored in the storing part according to an instruction from the output apparatus; and the output apparatus comprising:
an identification information acquisition part configured to acquire the identification information of the document data,
a block acquisition part configured to acquire each of the blocks of the document data corresponding to the identification information acquired by the identification information acquisition part from any one of the preserving apparatuses,
a document reproduction part configured to pack each of the blocks acquired by the block acquisition part and reproduce to the document data, and
an image forming part configured to output the document data reproduced by the document reproduction part.

2. The image forming system according to claim 1, wherein
the storing and transmitting part
decreases priority of transmission of the block to a preserving apparatus that is likely to be in an offline state,
increases the priority of transmission of the block to a preserving apparatus that has high processing capacity and/or new installation years, and
suppresses transmission of the block to a preserving apparatus that is expected to be in error.

3. The image forming system according to claim 1, wherein
the block acquisition part
calculates the previous hash value from last block in the order, repeatedly, and acquires the right block.

4. The image forming system according to claim 1, wherein
the transmitting apparatus is an image forming apparatus, and
the storing and transmitting part indicates the hash value of the document data as the identification information to a user.

5. The image forming system according to claim 1, wherein
the transmitting apparatus is a terminal that a user creates the document data.

6. An image forming apparatus comprising:
an identification information acquisition part configured to acquire identification information of document data for pull print;
a block acquisition part configured to acquire a block, into which the document data is divided, corresponding to the identification information acquired by the identification information acquisition part from other apparatus;
a document reproduction part configured to pack and decrypt the block acquired by the block acquisition part;
an image forming part configured to output the document data decrypted by the document reproduction part; and
a storing and transmitting part configured to transmit the block to at least two preserving apparatuses,
wherein the storing and transmitting part
decreases priority of transmission of the block to a preserving apparatus that is likely to be in an offline state,
increases the priority of transmission of the block to a preserving apparatus that has high processing capacity and/or new installation years, and
suppresses transmission of the block to a preserving apparatus that is expected to be in error.

7. The image forming apparatus according to claim 6, wherein
the block acquisition part
calculates the previous hash value from last block in the order, repeatedly, and acquires a right block.

8. The image forming apparatus according to claim 6, wherein
the storing and transmitting part indicates a user a hash value of the document data as the identification information.

9. An image forming method executed by an image forming system having a transmitting apparatus, a plurality of preserving apparatuses, and an output apparatus and allowing to pull print, comprising the steps of:
by the transmitting apparatus, generating identification information of a document data for the pull print, dividing into blocks, calculating and including a previous hash value of a previous block in order, and generating a blockchain of the document data;
by the transmitting apparatus, transmitting each of the divided blocks to at least two of the plurality of preserving apparatuses;
by the plurality of preserving apparatuses, storing a block received from the transmitting apparatus;
by the output apparatus, acquiring the identification information of the document data;
by the plurality of preserving apparatuses, transmitting the block stored in the respective preserving apparatus according to the instructions from the output apparatus;
by the output apparatus, acquiring each of the blocks corresponding to acquired identification information from any one of the preserving apparatuses;
by the output apparatus, packing each of the acquired blocks and reproducing to the document data; and
by the output apparatus, outputting the reproduced document data.

10. The image forming method according to claim 9, further comprising a step of:
by the transmitting apparatus,
decreasing priority of transmission of the block to a preserving apparatus that is likely to be in an offline state,
increasing the priority of transmission of the block to a preserving apparatus that has high processing capacity and/or new installation years, and
suppressing transmission of the block to a preserving apparatus that is expected to be in error.

11. The image forming method according to claim 9, further comprising a step of:
by the output apparatus,
calculating the previous hash value from last block in the order, repeatedly, and acquires a right block.

12. The image forming method according to claim 9, wherein
the transmitting apparatus is an image forming apparatus, and further comprising a step of:
indicating the hash value of the document data as the identification information to a user.

13. The image forming method according to claim 9, wherein
the transmitting apparatus is a terminal that a user creates the document data.

* * * * *